United States Patent [19]
Pinto et al.

[11] 3,894,844
[45] July 15, 1975

[54] SIMULTANEOUS DETERMINATION OF TRIGLYCERIDES, CHOLESTEROL AND PHOSPHOLIPIDS

[75] Inventors: Joseph Diago Pinto, Ridgewood, N.J.; Stephen Ian Hilburg, Tucson, Ariz.

[73] Assignee: American Cyanamid Company, Stamford, Conn.

[22] Filed: Jan. 31, 1974

[21] Appl. No.: 438,502

[52] U.S. Cl. ............................... 23/230 B; 252/408
[51] Int. Cl. .......................................... G01n 33/16
[58] Field of Search .................... 23/230 B; 252/408

[56] References Cited
UNITED STATES PATENTS

| | | | |
|---|---|---|---|
| 3,645,688 | 2/1972 | Smernoff .......................... | 23/230 B |
| 3,715,188 | 2/1973 | Denney ............................. | 23/230 B |
| 3,736,263 | 5/1973 | Parekh .............................. | 23/230 B |
| 3,751,381 | 8/1973 | Megraw ............................ | 23/230 B |
| 3,791,791 | 2/1974 | Finkel .............................. | 23/230 B |
| 3,799,739 | 3/1974 | Warburton ........................ | 23/230 B |

*Primary Examiner*—Morris O. Wolk
*Assistant Examiner*—Sidney Marantz
*Attorney, Agent, or Firm*—Jack W. Richards

[57] ABSTRACT

A procedure for the simultaneous determination of the amount of triglycerides, cholesterol and phospholipids present in a single sample of human plasma or serum using isopropyl alcohol to dissociate triglycerides and cholesterol from lipoproteins, an alumina-silicic acid adsorbent to separate triglycerides and cholesterol from phospholipids and other components and chemical methods together with colorimetric or fluorometric measurements for the quantitation of triglycerides, cholesterol and phospholipids.

2 Claims, 2 Drawing Figures

3,894,844

SIMULTANEOUS DETERMINATION OF TRIGLYCERIDES, CHOLESTEROL AND PHOSPHOLIPIDS

BACKGROUND OF THE INVENTION

The present invention is concerned with the diagnosis of lipid disorders and involves the dissociation, separation and quantitation of the three major lipid components of human serum or plasma, i.e., triglycerides, cholesterol and phospholipids and their simultaneous determination.

Triglycerides, phospholipids and cholesterol are important diagnostic aids in determining lipoprotein phenotype, fat metabolism, cell wall synthesis and propensity to atherosclerosis. The method of the present invention can be used for the aforementioned determinations in clinical laboratories and hospitals and in reference, commercial and industrial research. The method of the present invention can be used as a monitor in the early detection of coronary heart diseases and can serve as a diagnostic aid in the management of heart patients. The simplified method disclosed herein provides a rapid simultaneous means for the dissociation, separation and quantitation of the aforementioned three major lipid components of blood with a high degree of accuracy, precision and reproducibility.

Cholesterol, triglycerides and phospholipids are transported for the most part as lipoprotein molecules. Numerous measurements of these serum lipids indicate their importance as diagnostic indices for coronary disease. It has been postulated that a defect in the metabolism of triglycerides with the resultant accumulation in the plasma may be the most common metabolic error in patients with coronary heart disease. Estrogen administration to females produces a rise in serum phospholipid and a decrease in serum cholesterol with consequential decrease in cholesterol/phospholipid ratio which should be monitored. Finally, the findings of cholesterol deposits in plaques in the atherosclerotic emphasizes the importance of determing these three lipid parameters.

All known chemical analyses of triglycerides and cholesterol comprise: (1) dissociation of the triglycerides and/or cholesterol from the lipoproteins; (2) separation of triglycerides and/or cholesterol from interfering components; and (3) quantitation.

Dissociation is accomplished by such organic solvents as chloroform, isopropyl alcohol, etc., e.g., Kessler, G. et al., Technicon Symposium, "Automation in Analytical Chemistry," New York, 1965, pp. 341–344; Lofland, H. B., Anal. Biochem., 9: 393 (1964); Lofland, H. B., Addendum, Anal. Biochem., 10: 178 (1965); Leffler, H. H., Amer. J. Clin. Path., 31: 310–313 (1959); Connerty, H. V., et al., Clin. Chem. 7: 37 (1961); and Galletti, F. Clin. Chim. Acta, 6: 749 (1961).

Separation of triglycerides and cholesterol from such components of the serum and plasma as would interact with the reagents used in the analytical procedure has been accomplished by adsorbents. Such components are, for example, glucose, glycerol, phospholipids, creatinine, ammonia, bilirubin and hemoglobin. Removal of these interfering components has been achieved by adsorbents, such as silicic acid, zeolite, florisil, alumina and mixtures thereof. Handrel, et al., J. Lab. Clin. Med., 50: 152–157 (1957); Börgstrom, Acta physiol. scandinav, 25: 101–110 (1952); Royer, et al., Analytical Biochemistry, 29: 405–416 (1969); Jagannathan, Canadian Journ. Biochemistry, 42: 556–570 (1964); and Lofland, Analytical Biochemistry, 9: 393–400 (1964); Schön, et al., Physiological Chem. 303: 81–90 (1956). The interfering components, such as phospholipids, are adsorbed onto the above adsorbents while triglycerides and cholesterol are not.

Trappe, W., Biochem. Z. 306: 316–336 (1940), carried out the early studies for the chromatography of lipids on alumina. Trappe, W., page 334, also appears to disclose an adsorbent comprising alumina and silicic acid. Smith, I., Chromatographic and Electrophoretic Techniques, Vol. 1, Chromatography, 2nd ed., Interscience (1960), at page 368, discloses that the complementary properties of silicic acid and alumina have been found most valuable in dealing with phospholipids; and Rhodes, D. N., et al., Biochem. Journal, Vol. 65, p. 526 (1957), at page 532, disclose that alumina permits the rapid and complete separation of phospholipids, but that it must be followed on a silicic acid column if pure phosphatidylcholine is required. The separation and estimation of phospholipids using alumina and silicic acid is discussed in detail in Chromatographic and Electrophoretic Techniques, Vol. 1, Chromatography, 3rd ed., Interscience (1969), pages 450–493, and 2nd ed. thereof, at pages 363–373. However, no disclosure is known which employs alumina and silicic acid in the amounts set forth herein for use in the simultaneous determination of triglyceride, cholesterol and phospholipids as set forth herein.

Quantitation of triglycerides and/or cholesterol has been accomplished by a variety of chemical methods. After the triglycerides and cholesterol are dissociated from the lipoproteins and separated from other components of the serum, they are subjected to chemical methods. Such methods have involved hydrolyzing or saponifying the triglycerides with an alcoholic base (isopropanol-KOH) to glycerol followed by oxidizing the glycerol formed to formaldehyde by periodate. The formaldehyde is then reacted with ammonia and acetylacetone whereupon it forms a yellow lutidine compound, Kessler et al., supra; Van Handel et al., J. Lab. Clin. Med., 50: 152 (1957); Carlson et al., Clin. Chim. Acta, 4: 197 (1959); Nash, T., Biochem., 55: 416 (1953); Belman, S., Anal. Chim. Acta, 29: 120 (1963); Fletcher, M. J., Clin. Chim. Acta, 22: 393–397 (1968). The intensity of the yellow color is a measure of the concentration of formaldehyde formed and hence the amount of triglyceride present. Glucose, glycerol and phospholipids also give rise to formaldehyde under these conditions and artificially higher results are obtained from their incomplete removal. Cholesterol has been measured by treatment with ferric chloride in acetic acid. Such a procedure has been published by Leffler et al., Amer. J. Clin. Path. 39: 311–315 (1963); Leffler, Amer. J. Clin. Path. 31: 310–313 (1959); and Zlatkis, et al., J. Lab. Clin. Med., 41: 486–492 (1953).

To date, the chemical procedures available for phospholipid determination in serum or plasma comprise in the main converting organic phosphorus to inorganic phosphate by ashing with sulfuric acid and hydrogen peroxide. Clinical Chemistry Principles and Techniques, R. J. Henry, pp. 841–843 (1964). Aside from being time consuming, there is potential solvent hazard in this procedure. An advantage of the present invention is that the phospholipids are eluted from the alumina-silicic acid adsorbent with isopropanol-ammonium hydroxide mixture and quantitated in the same chemical fashion as triglycerides. The approach of the present invention is to hydrolyze phospholipids to glycerol and oxidize the latter with periodate utilizing the reagents and procedure used for triglyceride determination. The formaldehyde formed is then quantitated colorimetrically and/or fluorometrically as for triglycerides according to the Hantzsch reaction based upon a reaction between an amine, beta diketone and an aldehyde, Nash, T., Biochem. J. 55: 416 (1953) and Belman, S., Anal. Chim. Acta, 29: 120 (1963).

Commercially available kits or tests for measurement of triglycerides and/or cholesterol using adsorbents such as zeolite, silica gel and alumina are known such as those provided by Harleco; Wood Scientific, Inc.; and Oxford Laboratories. A commercially available kit is also known for phospholipid determination based on the principle of extraction followed by conversion of organic phosphorous to inorganic phosphorous and the assay of inorganic phosphorous (Boehringer Mannheim GmbH). However, no kit is known which uses alumina-silicic acid mixture as adsorbent in the amounts set forth herein in the simultaneous determination of triglycerides, cholesterol and phospholipids.

U.S. Pat. No. 3,645,688 discloses a method for measuring triglyceride and cholesterol levels in blood plasma or serum wherein interfering components in the plasma or serum, such as the phospholipids, are extracted with alumina or an alumina mixture. In the U.S. Pat. No. 3,645,688 isopropanol serves to coagulate the proteins for absorption onto the alumina and to dissolve the lipids to be separated. However, nowhere is the U.S. Pat. No. 3,645,688 concerned with phospholipid determination, the simultaneous determination of triglycerides, cholesterol and phospholipids, or the use of alumina-silicic acid mixture adsorbents. A comparative study has been made between the lipid method of the present invention and the method reported in the U.S. Pat. No. 3,645,688. An adsorbent of the U.S. Pat. No. 3,645,688 [alumina plus zeolite, $CuSO_4$ and $Ca(OH)_2$] was prepared as described therein. In comparative tests, it was found that the procedure of the U.S. Pat. No. 3,645,688 gave triglyceride and cholesterol values either too high or too low when commercially available lyophilized controls were assayed.

SUMMARY OF THE INVENTION

The present invention is concerned with lipid analysis and more particularly with the simultaneous determination of the amount of triglycerides, cholesterol and phospholipids in a single sample of human plasma or serum using isopropanol to dissociate triglycerides and cholesterol from lipoproteins, and as a solvent therefor, an alumina-silicic acid adsorbent to adsorb phospholipids and other undesired plasma or serum components and chemical methods together with colorimetric or fluorometric measurements for quantitation of triglycerides, cholesterol and phospholipids. The process of the present invention greatly simplifies the problem of removing interfering components of blood and readily and conveniently separates the lipid components for rapid analysis.

The present invention specifically includes a method for the simultaneous determination of triglycerides, cholesterol and phospholipids in human plasma or serum which comprises the steps of: adding isopropanol to plasma or serum to dissociate the triglycerides, cholesterol and phospholipids from the lipoproteins contained in the plasma or serum; mixing the plasma or serum containing the isopropanol with an adsorbent comprising alumina and silicic acid in a weight to weight ratio of from about 1 gram to about 0.70 gram alumina, preferably about 0.75 gram alumina, and about 0.25 gram silicic acid, to separate triglycerides and cholesterol from phospholipids, the triglycerides and cholesterol remaining in the isopropyl alcohol and the phospholipids being adsorbed by the adsorbent; separating the isopropanol containing the triglycerides and cholesterol from the adsorbent containing the phospholipids; eluting the phospholipids from said adsorbent with isopropanol-ammonia solution; treating the isopropanol containing the triglycerides and cholesterol and the isopropanol-ammonia containing the phospholipids by chemical methods; and performing colorimetric or fluorometric tests on the treated isopropanol-ammonia eluate containing the phospholipids and the isopropanol solution containing the triglycerides and cholesterol to thereby determine the amount of triglyceride, cholesterol and phospholipids present in a single sample of serum or plasma. The chemical method specifically employed to treat the isopropanol containing the triglycerides involves, in the order listed, treatment of the isopropanol-triglyceride solution with a saponification reagent (potassium hydroxide-isopropanol-water); an oxidizing reagent (sodium periodate-acetic acid); and a triglyceride color developing reagent (2,4-acetylacetone-isopropanol-ammonium acetate, pH 6.0 buffer). The chemical method specifically employed to treat the isopropanol containing the cholesterol involves treatment of the isopropanol-cholesterol solution with a cholesterol color developing reagent (ferric chloride-acetic acid-sulfuric acid catalyst). The chemical method specifically employed to treat the isopropanol-ammonia solution containing the phospholipids involves treatment of the phospholipid-isopropanol-ammonia solution with the same saponification reagent, oxidizing reagent and color developing reagent as employed in the clinical method for triglyceride. The method for cholesterol is based on the reliable procedure of Leffler, supra, using a color developing reagent consisting of ferric chloride in glacial acetic acid, modified from that proposed by Zlatkis, supra. The method for triglycerides is based upon the Hantzsch condensation reaction between an aldehyde, an amine and a $\beta$-diketone, Nask, T., supra, and Belman, S., supra.

The present invention also includes a diagnostic kit for the simultaneous determination of triglycerides, cholesterol and phospholipids in a single sample of human plasma or serum chiefly comprising an alumina-silicic acid adsorbent mixture containing from about 1 gram to about 0.70 gram alumina, preferably about 0.75 gram alumina, and about 0.25 gram silicic acid; a saponification reagent (75/25 mixture of isopropanol and 2% potassium hydroxide) to free fatty acid components from the triglycerides and phospholipids; an oxidizing reagent (a solution of 0.25 M sodium periodate in 2 M acetic acid) to oxidize the glycerol formed as a result of the saponification step to formaldehyde; a cholesterol color developing reagent for cholesterol color development (ferric chloride in glacial acetic acid) which can be colorimetrically or fluorometrically measured; a triglyceride and phospholipid color developing reagent for triglyceride and phospholipid color developement to react with the formaldehyde to form a yellow lutidine compound which can be colorimetrically or fluorometrically measured (2,4-pentanedione); isopropanol-ammonia (isopropanol 80%-ammonium hydroxide 20%) for extracting the phospholipids from said adsorbent mixture; and a combined standard solution containing 300 mg % each of triglycerides, cholesterol and phospholipids in isopropyl alcohol.

It has been found that the same triglyceride value on any given serum specimen is obtained whether silicic acid is present or not. However, silicic acid is a necessary and essential part of the adsorbent used in this invention as it has been found that the phospholipids cannot be removed from alumina alone once the phospholipids are bound to the alumina. In contrast, the phospholipids can be dissociated from silicic acid so as to permit the assay for phospholipids. The dual purpose accomplished here by the alumina-silicic acid adsorbent is to provide alumina to remove glucose, creatinine, and other interfering blood components in order to permit accurate triglyceride and cholesterol assay and silicic acid to adsorb phospholipids which can be recovered therefrom for phosphilipid assay. The preferred silicic acid is silica gel made up of precipitated silicic acid (Merck Index, 8th ed., page 945). The preferred alumina is exemplified by a product sold by M. Woelm, Eschwege, West Germany, comprising aluminum oxide (Merck Index, 8th ed., page 46). The preferred combination of alumina to silicic acid is 0.75 gram alumina and 0.25 gram silicic acid.

The chemical method for cholesterol of the present invention is based on the proven, reliable Leffler procedure, Leffler, H. H., Amer. J. Path., 31: 310 (1959). The chemical method for serum triglycerides is based on the Hantzsch condensation reaction between an aldehyde, an amine and a beta diketone, Nash, T., Biochem. J., 55: 416 (1953). The chemical method for phospholipids utilizes the heretofore unutilized chemical method for triglycerides. Heretofore, known methods for phospholipid analysis required approximately 6 hours. The process herein described provides phospholipid analysis in about 30 minutes. Phospholipids are hydrolyzed or saponified by isopropanol-potassium hydroxide to glycerol which can then be oxidized with sodium metaperiodate to formaldehyde. The formaldehyde formed can be measured by the Hantzsch condensation reaction in the same manner as triglycerides. According to the invention, the chemical method for measuring triglycerides and phospholipids are identical in principle. The amount of yellow color and/or fluorescence of the dimethyldihydrolutidine is directly proportional to the concentration of phospholipid in the serum sample.

BRIEF DESCRIPTION OF THE DRAWINGS

FIG. I is a flowsheet illustrating the steps to be carried out in the method of the present invention utilizing one embodiment thereof, the test tube procedure.

FIG. II is a flowsheet illustrating the steps to be carried out in the method of the present invention utilizing another embodiment thereof, the packed column procedure.

DETAILED DESCRIPTION OF THE INVENTION

Figure 1:
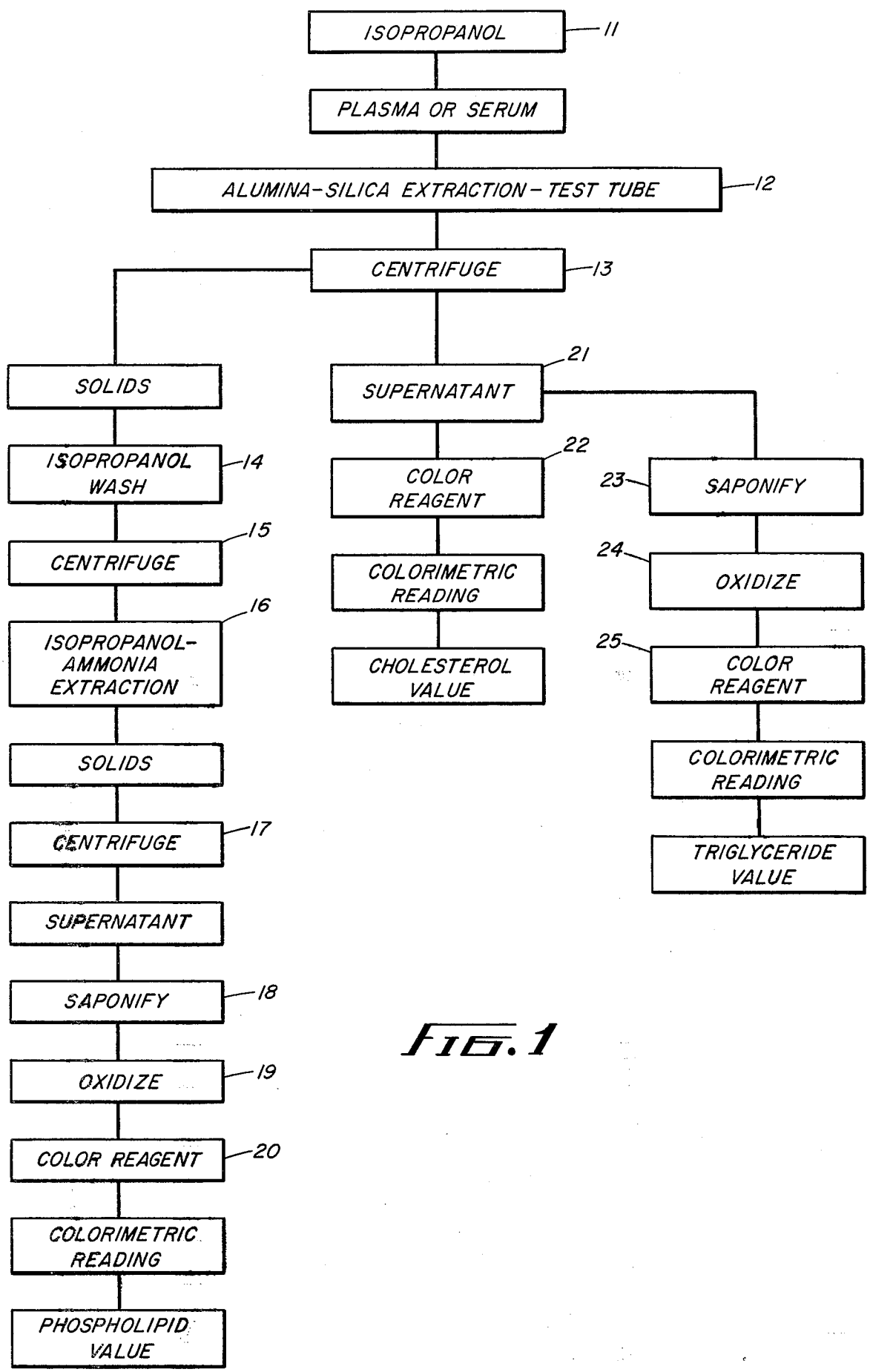
Figure 2:
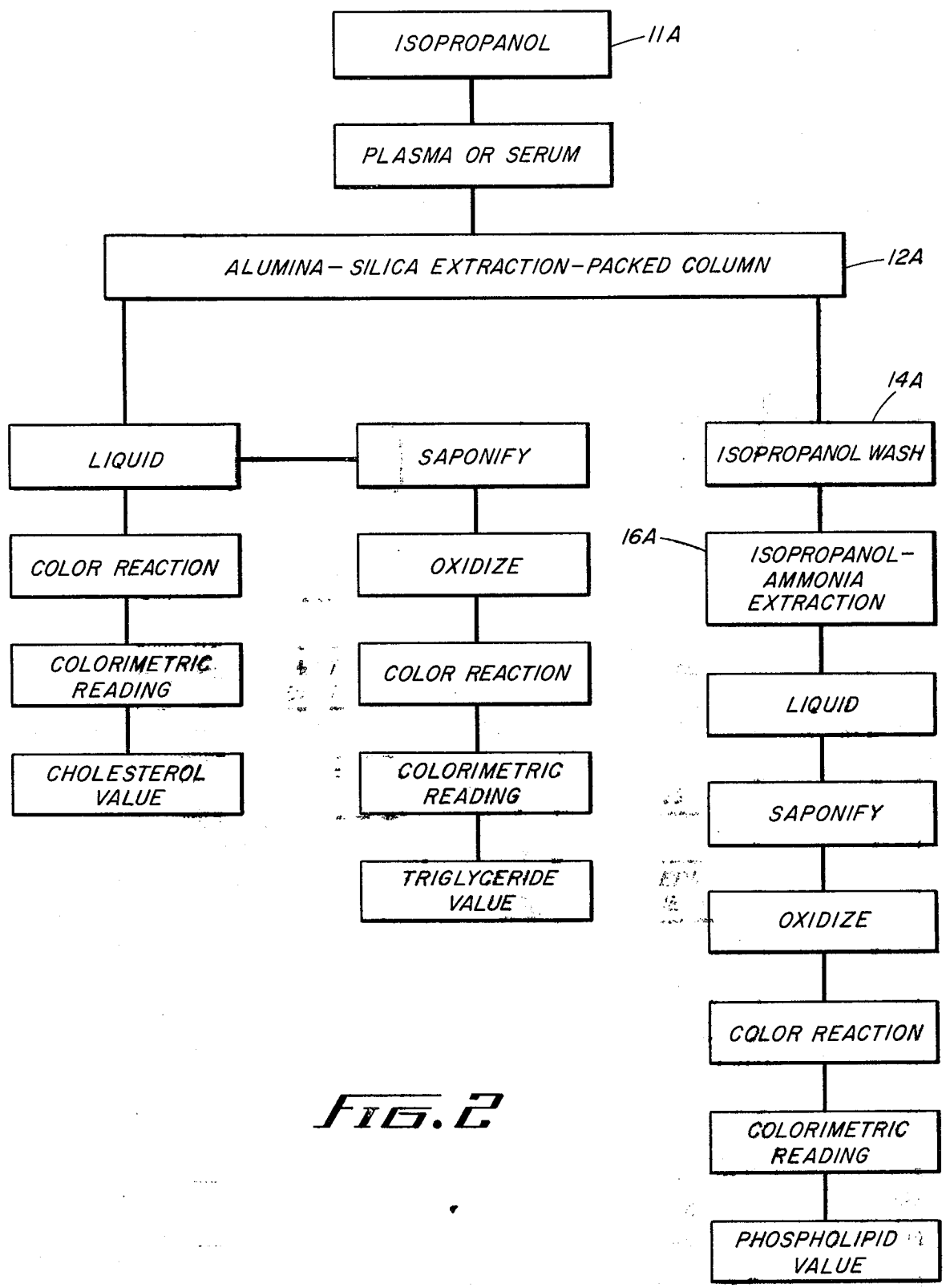

The invention will be more fully illustrated by the following examples and by reference to the flow sheets.

FIG. I illustrates one embodiment of the present invention for the simultaneous determination of triglyceride, cholesterol and phospholipid values from a single sample of a patient's plasma or serum using the test tube procedure. In step 11 isopropanol is added to the sample of plasma or serum in a test tube or the like. The mixture is then shaken, the isopropanol serving to precipitate proteins, to dissociate triglycerides, cholesterol and phospholipids from the lipoproteins and to aid in the extraction of triglycerides and cholesterol. The sequence of introducing the isopropanol and plasma or serum is not significant in that the plasma or serum may also be added to the isopropanol.

After mixing the plasma or serum and isopropanol together, the next step 12 is to add this mixture to a test tube containing the alumina-silicic acid adsorbent or extraction mixture. The mixture containing the plasma or serum and isopropanol and adsorbent is then shaken such as by inverting the tube to insure adsorption or extraction. In step 12 the phospholipids, glucose, bilirubin, gamma globulin, ammonia, creatinine, and other undesired plasma or serum components which interfere with the triglyceride and cholesterol assay are adsorbed by the adsorbent whereas the triglycerides and cholesterol remain in the isopropanol solution. The adsorbent permits an accurate triglyceride and cholesterol assay by removing blood components which interfere with the triglycerides and cholesterol assay. The presence of silicic acid in addition to permitting easy removal of the phospholipids therefrom to allow assay for phospholipids also functions to keep the alumina firmly on the bottom of the tube during pipetting of the supernatant thereby helping to eliminate flase values caused by the take up of alumina particles into the pipette. The silicic acid also forms a gelatinous layer over the alumina after centrifugation step 13, which tends to hold the alumina particles down on the bottom of the tube. In step 13, the tube containing the isopropanol, plasma or serum sample and alumina-silicic acid adsorbent mixture is centrifuged and the solid and supernatant phases separated from each other. In step 13 the alumina-silicic acid solids on which the phospholipids have been adsorbed are separated from the supernatant isopropanol extract containing the triglycerides and cholesterol.

In step 14 an isopropanol wash is added to the alumina-silicic acid solids on which the phospholipids have been adsorbed or vice versa and the mixture mixed thoroughly to wash out any contaminants. The wash mixture is then centrifuged in step 15 to separate the contaminants in the isopropanol wash from the desired solids. The isopropanol washings or supernatant is discarded. It is preferable to perform steps 14 and 15 at least twice, i.e., wash and centrifuge the solids at least twice with isopropanol. After washing with isopropanol in step 14, followed by centrifugation step 15, the solids are then treated or eluted with an isopropanolammonia extraction solution in step 16 (isopropanol and ammonium hydroxide in an 8:2 ratio) and the solids and extraction mixture thoroughly mixed. Step 16 extracts the phospholipids from the alumina-silicic acid solids. After extraction step 16, the extracting mixture and solids are centrifuged in step 17, the solids discarded and the supernatant or eluate isopropanol-ammonia extraction mixture containing the extracted phospholipids collected by decantation. Step 17 may, of course, be repeated if desired. In step 18 a portion of the supernatant from step 17 is transferred to a test tube and a saponification reagent (isopropanol-KOH) added thereto and the mixture shaken, mixed and incubated. The saponification reagent comprises potassium hydroxide in water and isopropanol and it is used to hydrolyze the phospholipids to glycerol. After saponification step 18, the glycerol from the hydrolyzed phospholipids is oxidized to formaldehyde in step 19 by the addition of an oxidizing reagent (a solution of 0.25 M sodium periodate in 2 M acetic acid diluted with 1 N acetic acid) shaken, mixed and heated on a water bath. After oxidation, a phospholipid color developing reagent (2,4-pentanedione or acetylacetone in ammonium acetate buffer) is added in step 20 to react with the formaldehyde according to the known Hantzsch condensation reaction to give a characteristic yellow color. The amount of yellow color is directly proportional to the concentration of phospholipid present in the plasma or serum sample being analyzed. The colorimetric reading and phospholipid value is determined according to known and standard procedures.

As mentioned heretofore, centrifugation step 13 separates the solids containing the phospholipids from the supernatant isopropanol containing the triglycerides and cholesterol. In step 21 separate portions of the supernatant isopropanol extract containing the triglycerides and cholesterol are taken for triglyceride and cholesterol determinations. In step 22, a portion of the supernatant from step 21 is transferred to a test tube and a cholesterol color developing reagent added ($FeCl_3 \cdot 6H_2O$ in glacial acetic acid). The cholesterol is then measured by using a modified Zlatkis color developing reagent comprising ferric chloride in glacial acetic acid. The ferric ion reacts with cholesterol in the presence of the acetic acid and sulfuric acid catalyst to give a violet color, Leffler et al, Amer. J. Path., 39:311 (1963). The colorimetric reading and cholesterol value is determined according to known and standard procedures.

In step 23, a portion of the isopropanol supernatant from step 21 is transferred to a test tube and a saponification reagent is added (potassium hydroxide in water and isopropanol) and the mixture shaken, mixed and incubated. The saponification reagent used here is the same reagent used for the phospholipid assay. After saponification step 23, an oxidizing reagent (sodium metaperiodate dissolved in acetic acid) is added in step 24 and the mixture mixed. Again, this is the same oxidizing reagent used in the phospholipid assay. Next, a triglyceride color developing reagent (2,4-pentanedione in ammonium acetate buffer) is added in step 25 and the mixture shaken and mixed. Again, this is the same color reagent used in the phospholipid assay. The tube is incubated in a water bath. As in the phospholipid assay, the assay for triglyceride is based on the Hantzsch condensation reaction between an aldehyde, an amine and a beta diketone. The chemical method for measuring triglyceride and phospholipid values is identical in principle. The amount of yellow color is directly proportional to the concentration of triglyceride present in the plasma or serum sample being analyzed. The colorimetric reading and triglyceride value is determined according to known and standard procedures.

FIG. II illustrates a second embodiment of the present invention using a packed column procedure. In step 11A isopropanol is added to the sample of plasma or serum, and/or vice versa, and the mixture shaken. The isopropanol solution is then passed through a packed column, in step 12A, packed with the alumina-silicic acid adsorbent or extraction mixture as hereinbefore described and the extracted liquid collected. Portions of the extracted liquid are then tested for triglyceride and cholesterol as hereinbefore disclosed with reference to FIG. I. In step 14A, the packed column is washed with isopropanol one or more times and the washings discarded. In step 16A, the adsorbent in the column is eluted with isopropanol-ammonia solution and the eluate collected and tested for phospholipids, all as set forth hereinbefore with reference to FIG. I. The simplified column procedure embodiment illustrated by FIG. II lends itself well to use by the practitioner and small clinics. In this embodiment premeasured amounts of alumina-silica gel (75:25 w/w) are to be provided in small plastic columns, preferably containing a filter thereby cutting down on the extraction time and eliminating particles of alumina to which the interfering materials are bound. The packed column procedure lends itself well to package in kit form.

EXAMPLE 1

Test Tube Procedure

A 0.3 ml. sample of serum is mixed with 9.7 ml. of isopropanol. This mixture is added to a tube containing adsorbent consisting of a mixture (75:25 parts w/w) of alumina (washed Woelm neutral alumina) and silica gel (washed) and shaken by inverting the tube. The tube is centrifuged for about 10 minutes. The supernatant liquid is separated from the solids by decantation and both components are saved.

Cholesterol Analysis 1.0 Ml. of the supernatant from above is transferred to a test tube. A 2.0 ml. portion of ferric chloride color reagent (500 mg. of $FeCl_3 \cdot 6H_2O$ in 500 ml. of glacial acetic acid) is added and the solution is mixed. A 2.0 ml. portion of concentrated sulfuric acid is added by running sulfuric acid down the side of the tube to avoid mixing and the contents are then mixed by tilting the tube about six times. The solution is immediately transferred to a 10 or 12 mm. cuvette and allowed to cool for 10 minutes. The cuvette is then placed in a standard colorimeter and the adsorbance at 540 m$\mu$ is determined against a reagent blank. The cholesterol content of the blood is determined by comparison of this adsorbence value against the adsorbence value of a cholesterol standard or standard curve.

Triglyceride Analysis 2.0 Ml. of the above supernatant from the sample is transferred to a test tube. A 0.6 ml. portion of saponification reagent (5.0 gm. of potassium hydroxide in 250 ml. of water and 750 ml. of isopropanol) is added and mixed. The tube is incubated in a 60°–70°C. water bath for 15 minutes. A 1.0 ml. portion of oxidizing reagent is added and mixed. (5.4 gm. of sodium metaperiodate in 1 N acetic acid and diluted to 1 liter with 1 N acetic acid and dilute 12 ml. of this stock solution and 20 ml. of isopropanol to 100 ml. with 1 N acetic acid). A 0.5 ml. portion of acetylacetone color reagent (0.75 ml. of 2,4-pentanedione and 2.5 ml. of iospropanol added to 100 ml. of 2 M ammonium acetate, pH 6.0 buffer) is added and mixed. The tube is incubated in a 60°–70°C. water bath for 15 minutes. The contents are allowed to cool for 5 minutes and the adsorbence is then determined on a standard colorimeter against a reagent blank at 405 mμ. The triglyceride content of the serum is determined by the comparison of this adsorbence value against the adsorbence value of a triglyceride standard or standard curve.

Phospholipid Analysis

A 10.0 ml. portion of isopropanol is added to the adsorbed serum sample solids, mixed thoroughly and centrifuged for 5 minutes. The supernatant is discarded. A 5.0 ml. portion of ammonia-isopropanol extraction solution (isopropanol and concentrated ammonium hydroxide in an 8:2 ratio) is added to the solids and mixed. The mixture is centrifuged for 5 minutes and the supernatant is collected by decantation. A 2.0 ml. portion of this supernatant is transferred to a test tube. A 1.0 ml. portion of saponification reagent (same as used in triglyceride analysis of this example) is added and mixed. The tube is incubated in a 60°–70°C. water bath for 15 minutes. A 1.0 ml. portion of oxidizing reagent (same as used in triglyceride analysis of this example) is added, mixed and heated in a 60°–70°C. water bath for 5 minutes. A 1.0 ml. portion of acetylacetone color reagent (same as used in triglyceride analysis of this example) is added, mixed and incubated in the 60°–70°C. water bath for 15 minutes. The contents are allowed to cool and then the adsorbence is determined against a reagent blank on a standard colorimeter at 405 mμ. The phospholipid content of the serum is determined by comparison of this adsorbence value against the adsorbence value of a phospholipid standard or standard curve.

EXAMPLE 2

Packed Column Procedure

A simplified column procedure, particularly adapted for the practicing physician and small clinics may be performed as follows. The same (0.3 ml. serum + 9.7 ml. isopropanol) is allowed to pass through the column which is packed with alumina-silica gel adsorbent (75:25). The extracted liquid is collected in a 10 ml. capacity test tube. The extracted liquid is used to test for cholesterol and triglyceride content as described in Example 1. The column is washed with 10 ml. of isopropanol, extracted with 5.0 ml. of ammoniaisopropanol solution and the extract is used to test for phospholipids as described in Example 1.

EXAMPLE 3

The following example illustrates the invention and its use in a kit form. The kit contains most of the reagents necessary to perform a cholesterol, triglyceride and phospholipid assay on a single small volume of serum (0.5 cc) and will do all these tests after a single extraction of interfering substances on alumina-silica gel. Each kit contains reagents necessary for 25 tests each of cholesterol, triglycerides and phospholipids, except for the isopropyl alcohol.

Reagents Provided

1. Alumina-silicic acid extraction mixture (0.75 g. alumina and 0.25 g. silica gel), 30 grams, 25 small plastic columns each containing approximately 1 gm. of alumina-silicic acid extraction mixture. A measuring spoon to deliver approximately 1 gram. The premeasured amounts of alumina-silica gel are provided in small plastic columns containing a filter thereby cutting down on the extraction time and eliminating particles of alumina to which the interfering materials are bound. The alumina should be spread in a pan and placed in an oven overnight at 110°–120° to dry. When it is removed from the oven it should be covered with aluminum foil and allowed to cool to room temperature. The alumina and silica gel are mixed together in the weight ratio of 3:1 and approximately 1 g. of this mixture is then put into each of the 25 small plastic columns in each kit.

2. Saponification reagent (Isopropanol-KOH 75/25 mixture). One bottle containing approximately 65 ml. of 25 parts aqueous 2% potassium hydroxide and 75 parts isopropyl alcohol. The isopropanol-KOH solution is prepared as follows per liter of solution. Dissolve 2 g. KOH in 100 ml. water or 20 g. in 1 liter water. Take 250 ml. of this 2% aqueous KOH solution and add it to 750 ml. of analytical grade isopropyl alcohol (aldehyde-free). For 250 liters of solution it is necessary to prepare 63 liters of 2% KOH. Dissolve $20 \times 63 = 1,360$ g. KOH in 63 liters of distilled water. Add this to 186 liters of isopropyl alcohol. This addition should be done slowly and with occasional stirring. Add the KOH to the isopropyl alcohol.

3. Oxidizing reagent (Sodium Metaperiodate). One bottle containing approximately 10 ml. of a stock solution of 0.25 M sodium periodate in 2 M acetic acid. A 10 ml. aliquot is provided in each vial of 10 ml. capacity. To prepare, dissolve 0.535 g. sodium periodate in 100 ml. 2 M acetic acid. For 5,000 kits it is necessary to have $5,000 \times 10$ ml. $= 50,000$ ml. or 50 liters. Prepare 50 liters of 2 M acetic acid as follows. In a graduated cylinder measure out $114 \times 50 = 5,700$ ml. glacial acetic acid and add 44,300 ml. distilled water. Mix thoroughly. Weigh out 267.5 g. sodium periodate and add this to the 2 M acetic acid and stir to dissolve.

4. Ammonium acetate buffer. A 2 M ammonium acetate, pH 6.0, solution. 100 Ml. per kit in 120 ml. bottle. It is prepared by dissolving 154 g. in 900 ml. distilled water, the pH adjusted to 6.0 with 1 N acetic acid and volume made up to 1 liter. For 5,000 kits, 500 liters of this 2 M ammonium acetate buffer is prepared. This is done by weighing out $154 \times 500 = 77,000$ g. ammonium acetate and dissolving in approximately 450 liters distilled water. Adjust pH to 6 with 1 N acetic acid and make volume up to 500 liters.

5. Isopropyl alcohol (80%) – ammonia (20%) extractant for extracting phospholipids (isopropanol and ammonium hydroxide in an 8:2 ratio). A 150 ml. bottle of extractant.

6. 2,4-Pentanedione. 2.5 Ml. in each 5 ml. screw-cap bottle per kit.

7. Combined standard solution consisting of 300 mg. % each of triglycerides, phospholipids and cholesterol in isopropyl alcohol. 2.5 Ml. of triolein, cholesterol and lecithin in a 5 ml. brown screw-cap bottle. For 5,000 kits, 12,500 ml. of standard is prepared. This solution will contain 300 mg. of triolein, 500 mg. % lecithin, 500 mg. % cholesterol. To prepare, weigh out 3 g. triolein, 5 g. lecithin and 5 g. cholesterol. Add isopropyl alcohol to volume of 1,000 cc.

For 12,500 ml. weigh out
$3 \times 12.5 = 37.5$ g. triolein
$5 \times 12.5 = 62.5$ g. lecithin
$5 \times 12.5 = 62.5$ g. cholesterol Add isopropyl alcohol to final volume of 12,500 ml.

8. Ferric chloride-acetic acid reagent for cholesterol color development. Approximately 62–63 ml. per kit of 62 × 5,000 = 310,000 total or 310 liters. 0.5 G. $FeCl_3 \cdot 6H_2O$ dissolved in 500 ml. glacial acetic acid or 1 g. per liter glacial acetic acid. Dissolve 310 g. $FeCl_3 \cdot 6H_2O$ in 310 liters glacial acetic acid.

Reagents Not Provided

1. Isopropyl alcohol reagent grade, aldehyde-free, for dislodging cholesterol, triglycerides and phospholipids from the lipoproteins in the serum or plasma.
2. 1 N Acetic acid. This is to be prepared by taking 17.6 ml. glacial acetic acid and making it up to 1 liter with distilled water. This solution is used to prepare the working oxidizing reagent.
3. Concentrated sulfuric acid.

Reagents to be Prepared by User

1. The triglyceride and phospholipid color developing reagent is prepared by mixing 0.75 ml. 2,4-pentanedione (reagent 6 above), 2.5 ml. isopropyl alcohol and making up to 100 ml. with ammonium acetate buffer (reagent 4 above). This should be stored in a brown bottle in the refrigerator when not in use. This reagent is stable for at least 6 weeks in the refrigerator.
2. Working oxidizing solution. A stock periodate solution (reagent 3 above) is provided; 2.5 ml. of this solution is diluted to 25 ml. with 1 N acetic acid.

Directions for Use

1. Preparation of triglyceride color developing reagent. Open the 2,4-pentanedione bottle (reagent 6 above), pipette out 0.75 cc and deliver to a 100 cc volumetric flask. Add 2.5 ml. isopropyl alcohol and then add ammonium acetate buffer to bring volume up to 100 cc.
2. Working oxidizing reagent. Prepare 1 N acetic acid. Open the stock oxidizing bottle (reagent 3 above), take 2.5 ml. of this solution and dilute to 25 ml. with 1 N acetic acid.
3. Standard curve. A standard solution of 300 mg. % each of triglycerides, cholesterol and phospholipids in isopropyl alcohol is provided. Using stoppered test tube the following dilutions can be made.

| | Stock Standard | Isopropyl Alcohol | Concentrations of Working Standards |
| --- | --- | --- | --- |
| 1 | 1.00 | 0.0 | 300 mg % |
| 2 | 1.00 | 1.00 | 150 mg % |
| 3 | 1.00 | 2.00 | 100 mg % |
| 4 | 0.5 | 4.50 | 50 mg % |

Specimen

The blood sample should be from individuals fasted for at least 6 hours, and exhibit no hemolysis. The collection container should be heparin free, and the clot should be separated within 40 minutes of formation.

The test may be performed on serum samples held at room temperature for up to 24 hours, refrigerated samples for up to 2 days, and indefinitely on sera kept frozen.

Apparatus Needed

1. General laboratory glassware.
2. 60°–70°C. water bath.
3. Suitable spectrophotometer capable of reading 405 nm and 540 nm.
4. Vortex mixer.

Directions for Use

Clinical Assay

1. Mark three extraction columns B (blank), S (standard) and U (unknown). Remove the upper large cap.
2. Add 9.7 ml. of isopropyl alcohol to each column.
3. Deliver 0.3 ml. of water to column B, 0.3 ml. of stock standard to column S, and 0.3 ml. of patient serum to column U.
4. Replace the column caps and shake the column for one minute by hand.
5. Place columns over similarly marked test tubes, remove both caps off columns and allow solutions to drain into test tubes. These extracts are used for cholesterol and triglyceride assays.
6. Remove columns from test tubes, replace lower caps, and add 10 ml. of isopropyl alcohol to each column. Replace upper caps, shake briefly, and remove caps. Allow alcohol wash to drain into discard beaker. Repeat isopropyl alcohol wash once more. Again discarding wash.
7. Place columns over appropriately labeled tubes, add 5 ml. of isopropyl alcohol-ammonia (reagent 5 above) to each column, shake 1 minute, and allow to drain into tubes. These extracts are used for phospholipid assays.

Triglyceride Determination

1. Deliver 2.0 ml. from each tube in step 5 above into test tubes marked B, S, and U.
2. Add 0.6 ml. of saponification reagent (reagent 2 above) to each tube, Vortex mix for 5–10 seconds, and heat for 15 minutes at 60°–70°C. in a water bath.
3. Remove tubes from bath, add 1.0 ml. of working oxidizing solution (prepared as per directions for use 2) to each and mix briefly.
4. Add 0.5 ml. of color developing reagent (prepared as per directions for use 1) to each tube, vortex and reincubate
for 15 minutes at 60°–70°C. in a water bath.
5. Remove tubes from bath and allow them to cool for 5 minutes.

Measure optical density at 405 nm, setting the instrument to zero with the reagent blank. The color is stable for 30 minutes. If the optical density of the patient's serum is too high, the procedure can be repeated diluting the initial extract with an equal amount of isopropyl alcohol,

Cholesterol Determination

1. Deliver 1.0 ml. from each tube in step 5 above into test tubes marked B, S, and U.
2. Add 2.0 ml. of ferric-chloride reagent (reagent 8 above) to each tube and mix thoroughly.
3. Add 2.0 ml. of concentrated sulfuric acid to each tube and mix carefully by tilting tubes back and forth.
4. Allow tubes to cool for 10 minutes.
5. Measure optical density at 540 nm, setting the instruments to zero with the reagent blank. The color is stable for 10 minutes.

Phospholipid Determination

1. Deliver 2.0 ml. from each tube in Step 7 above into test tubes marked B, S, and U.

2. Add 1.0 ml. of saponification reagent (reagent 2 above) to each tube.

3. Incubate tubes for 15 minutes in a water bath at 60°–70°C.

4. Remove tubes from bath, add 1.0 ml. of working oxidizing solution (prepared as per directions for use 2) to each tube and mix briefly.

5. Add 0.5 ml. of color developing reagent (prepared as per directions for use 1) to each tube, vortex and reincubate for 15 minutes at 60°–70°C. in a water bath.

6. Remove tubes from bath and allow them to cool for 5 minutes.

7. Measure optical density at 405 nm, setting the instrument to zero with the reagent blank. The color is stable for 15 minutes.

Calculations

The concentrations of triglycerides, cholesterol and phospholipids can be determined by performing the method described above with each of the working standard solutions. A standard curve is then plotted, plotting optical density against concentration. If the optical densities for extracts from a patient's serum were 0.100 for triglycerides, 0.140 for cholesterol and 0.090 for phospholipids, then the concentration in mg % for each constituent as read from the standard curves would be 75 mg % triglycerides, 175 mg % cholesterol, and 200 mg % phospholipids.

Alternately, concentrations can be determined directly from the clinical assay as outlined in Directions for Use. If the tests using a 100 mg % standard yielded an O.D. of 0.135 for triglycerides, 0.080 for cholesterol and 0.045 for phospholipids, and the optical densities in tests of extracts from a patient's serum were those illustrated above, the concentrations of constituents can be calculated as follows:

$$= \frac{OD\ 405\ nm\ Unknown}{OD\ 405\ nm\ Standard} \times \text{Concentration of Standard (mg \%)}$$

$$= \frac{0.100}{0.135} = 100 = 74\ mg\ \%$$

Concentration of phospholipids $$= \frac{OD\ 405\ nm\ Unknown}{OD\ 405\ nm\ Standard} \times \text{Concentration of Standard (mg \%)}$$

$$= \frac{0.090}{0.045} \times 100 = 200\ mg\ \%$$

Concentration of Cholesterol $$= \frac{OD\ 540\ nm\ Unknown}{OD\ 540\ nm\ Standard} \times \text{Concentration of Standard (mg \%)}$$

$$= \frac{0.140}{0.080} \times 100 = 175\ mg\ \%$$

Interferences from Serum Constituents

The following substances have been shown to produce no interference with determination of the three lipids using the above procedure:

Glucose up to 300 mg %, bilirubin up to 12 mg %, creatinine up to 18 mg %, glycerol up to 15 mg %, threonine up to 9 mg %, serine up to 9 mg %, tryptophan up to 9 mg %, and potassium bromide up to 15 mg %. Salicylate added to normal serum gave no interference with triglyceride and phospholipid determinations up to 15 mg %; at this concentration, cholesterol values were increased approximately 12%.

We claim:

1. A method for the simultaneous determination of triglycerides, cholesterol and phospholipids in a single sample of human plasma or serum which comprises the steps of:

a. adding isopropyl alcohol to said sample to dissociate triglycerides, cholesterol, and phospholipids from lipoproteins contained therein;

b. mixing said sample containing isopropyl alcohol solution with an adsorbent comprising from about 1 gram to about 0.70 gram alumina and about 0.25 gram silicic acid to separate triglycerides and cholesterol from phospholipids, the triglycerides and cholesterol remaining in the isopropyl alcohol solution and the phospholipids being adsorbed on said adsorbent;

c. separating the isopropyl alcohol solution containing the triglycerides and cholesterol from said adsorbent containing the phospholipids;

d. eluting the phospholipids from said adsorbent with isopropyl alcohol-ammonia solution;

e. treating a portion of the isopropyl alcohol solution containing the triglycerides and a portion of the isopropyl alcohol-ammonia eluate containing the phospholipids with the same saponification reagent to hydrolyze the triglyceride and phospholipids to glycerol;

f. adding the same oxidizing agent to each of the saponified solutions to oxidize the glycerol to formaldehyde;

g. adding the same color reagent to each of the oxidized solutions for triglyceride and phospholipid color development;

h. treating a portion of the isopropyl alcohol solution containing the cholesterol with a different color reagent for cholesterol color development; and i. performing a colorimetric reading on each of the three solutions for triglyceride, phospholipid and cholesterol, respectively, and determining the triglyceride, phospholipid and cholesterol values therefrom.

2. The method of claim 1 wherein the sample is serum, the adsorbent is 0.75 gram alumina and 0.25 gram silica gel, the saponification reagent is aqueous potassium hydroxide in isopropanol, the oxidizing agent is sodium periodate in acetic acid, the triglyceride and phospholipid color developing reagent is 2,4-pentanedione in ammonium acetate buffer and isopropanol, and the cholesterol color developing reagent is ferric chloride in glacial acetic acid.

* * * * *

UNITED STATES PATENT OFFICE
CERTIFICATE OF CORRECTION

PATENT NO. : 3,894,844
DATED : July 15, 1975
INVENTOR(S) : Joseph Diago Pinto, Stephen Ian Hilburg It is certified that error appears in the above–identified patent and that said Letters Patent are hereby corrected as shown below:

Column 13, line 38, insert --Concentration of triglycerides --.

Signed and Sealed this fourth Day of November 1975

[SEAL]

Attest:

RUTH C. MASON
*Attesting Officer*

C. MARSHALL DANN
*Commissioner of Patents and Trademarks*